Patented Feb. 5, 1946

2,393,999

UNITED STATES PATENT OFFICE 2,393,999

COMPOSITIONS OF MATTER

Walter C. McCrone, Ithaca, N. Y.

No Drawing. Application September 3, 1943,
Serial No. 501,134

1 Claim. (Cl. 260—326)

This invention relates to new compositions of matter, the n-butyl imide of 3,6-endomethylene-4-cyclohexene-1,2-dicarboxylic acid, and to fly spray compositions which contain the same as an essential active agent.

The control of flies and other household insects has been largely effected in the past through the instrumentality of pyrethrum fly sprays. Thiocyanates have been suggested as replacement for pyrethrum but because of their undesirable odor and irritating action the thiocyanates, except under war emergency conditions, have not been found useful in the household fly spray field. It has been found that part of the pyrethrum in household fly sprays may be replaced by N-isobutylundecylenamide. But, even so, there is still a need in the art for an agent which will displace greater amount of pyrethrum, which has now become a strategic material in view of the war emergency.

According to the present invention this desideratum is achieved through the instrumentality of the compound, the n-butyl imide of 3,6-endomethylene-4-cyclohexene-1,2-dicarboxylic acid, which is highly toxic to flies and other insect pests and may be used in pyrethrum fly sprays to displace as much as 90% or more of the pyrethrum without loss of lethal and paralytic properties and up to 95% or more of the pyrethrum without loss of lethal properties and without substantial diminution of the paralytic property.

The compounds of the invention may be prepared from cyclopentadiene, maleic anhydride and n-butylamine. The cyclopentadiene monomer is obtained by distilling cyclopentadiene dimer. This specially distilled cyclopentadiene monomer readily reacts with maleic anhydride according to the diene synthesis yielding the anhydride of 3,6-endomethylene-4-cyclohexene-1,2-dicarboxylic acid. This anhydride is then refluxed with n-butylamine to give the desired product, N-n-butyl imide of 3,6-endomethylene-4-cyclohexene-1,2-dicarboxylic acid.

The following example, in which the parts are by weight, is illustrative:

Example

Preparation of N-n-butyl imide of 3,6-endomethylene-4-cyclohexene-1,2-dicarboxylic acid.

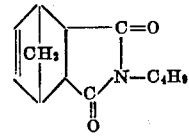

The anhydride of the above acid is first prepared by bubbling 132 g. of freshly distilled cyclopentadiene monomer (B. P. 41° C.) below the surface of a mixture of 196 g. of maleic anhydride and 352 g. of benzene at ordinary room temperature and injecting the cyclopentadiene as rapidly as is consistent with adequate reflux to prevent loss of reactant. This operation is complete in about 30 minutes.

73 grams of dry n-butylamine is then added as rapidly as reflux capacity will permit. Water is removed from this mixture in an apparatus for refluxing and distilling it, separating the water, and returning the benzene to the reaction pot. After removal of 16.5 cc. of water by this procedure the benzene is distilled from the product leaving a residue with an acid number of 9.5. The crude acidic material amounting to 214 g. may be purified by direct distillation or by first alkaline scrubbing and then distillation. A satisfactory product is obtained by scrubbing the crude acidic material with a slight excess of the theoretical amount of 5% sodium hydroxide solution which results in a loss of approximately 6–8% in the weight of the acidic product. The substantially neutral product is then further purified by distillation from a modified Claisen flask giving a colorless oil boiling at 134–137° C./2 mm. and solidifying at 42–44° C. This product has a solubility in Deobase-kerosene above about 13% at 25° C. Analysis shows a nitrogen content of 6.32% and a refractive index of $n_D^{40°\,C.} = 1.5030$.

The n-butyl imide of this invention is of particular value in the preparation of fly sprays because it combines adequately high solubility in the refined kerosenes used as fly spray bases with exceptional toxicity. This combination of properties is a desirable if not an essential requirement in this art in view of the practice of making concentrates for distribution to various manufacturers.

Pyrethrum fly sprays generally contain 100 or 120 mgs. of pyrethrum according to grade. Any amount of this pyrethrum up to about 90–95% may be replaced by the n-butyl imide of the invention. Thus the fly spray compositions of the invention may contain from about 5 to 100 mgs. pyrethrum per 100 cc. together with sufficient imide to give the desired paralytic and lethal properties.

Ordinarily this can be obtained by including approximately 10 parts by weight of the imide for each part of pyrethrum replaced. The preferred minimum for the imide, therefore, is equal to 10 times 100 minus P, where P is the amount of pyrethrum. In a typical concentrate the minimum amount of imide would be represented by the formula $10(100X-P)$, where P is the amount of pyrethrum per 100 cc. in the concentrate and X is dilution factor, i. e., the volume ratio of fly spray to concentrate.

The data given in the following table are illustrative of compositions containing various mixtures of n-butyl imide of 3,6-endomethylene-4-cyclohexene-1,2-dicarboxylic acid with pyrethrum. These compositions are comparable in efficiency to the standard 100 mg. fly sprays (class B), or the equivalent, which are available on the open market. The data illustrate the marked synergism of the imide pyrethrum mixtures. If only the additive effects were involved the composition curve would be a linear one, ranging from the 2000 mgs. or more of the imide required to equal the kill of the 100 mg. pyrethrum spray to the 100 mgs. of pyrethrum. Hence the theoretical composition may easily be calculated, for example, if the mixture contains 40% pyrethrum (40 mg.) it should contain 60% imide or 1200 mgs. It will be observed from the data given in the table that actually less than one-half of that amount of imide is required. This is indicative of a very marked synergism.

Table

| Actual composition, mg./100 cc. | | Calculated theoretical composition | | Percentage control | Percentage kill over and above standards | |
|---|---|---|---|---|---|---|
| Imide | Pyrethrum | Imide | Pyrethrum | | OTI | PTI |
| 0 | 100 | | | [1] 98–28 | 0 | +9 |
| 0 | 100 | | | 98–35 | 0 | 0 |
| 0 | 100 | | | 98–41 | 0 | 0 |
| 0 | 100 | | | 98–44 | 0 | −4 |
| 0 | 100 | | | 98–37 | 0 | 0 |
| 0 | 100 | | | [1] 98–26 | 0 | +8 |
| 420 | 40 | 420 | 79 | 98–30 | [1] +4 | −4 |
| | | 1,200 | 40 | | | |
| 550 | 40 | 550 | 72 | 97–35 | +7 | −2 |
| | | 1,200 | 40 | | | |
| 780 | 28 | 780 | 61 | 97–34 | +6 | −3 |
| | | 1,440 | 28 | | | |
| 1,000 | 20 | 1,000 | 50 | 97–43 | +5 | +5 |
| | | 1,600 | 20 | | | |
| 1,000 | 15 | 1,000 | 50 | 97–46 | +5 | +5 |
| | | 1,700 | 15 | 96–41 | [1] +13 | +4 |
| 1,250 | 4 | 1,750 | 37 | 93–48 | 0 | −2 |
| | | 1,920 | 4 | | | |
| 2,000 | 0 | | | 83–34 | 0 | 0 |
| 2,000 | 0 | | | 63–36 | 0 | −3 |

OTI=official test insecticide (100 mgs. pyrethrum).
PTI=proprietary test insecticide (pyrethrum activated with N-isobutylamide of undecylenic acid).
[1] Kill for OTI unusually low.

While the imide of the invention is particularly useful in household insecticides in the formulation of hydrocarbon fly sprays it is not so limited in utility. It may, for example, be used as mosquito repellent, delousing agent, and as contact insecticide in the agricultural field. It may further be used as a plasticizer, as petroleum product assistant, and as intermediate in dye-stuffs and pharmaceuticals.

While I have described my invention with reference to particular combinations it will be understood that variations may be made therein within the scope and spirit of the invention, in accordance with the scope of the appended claim.

I claim:

A composition of matter comprising N-n-butyl-3,6-endomethylene-4-cyclohexene-1,2-dicarboxylic imide.

WALTER C. McCRONE.